(12) United States Patent
Yamaguchi et al.

(10) Patent No.: US 11,022,112 B2
(45) Date of Patent: Jun. 1, 2021

(54) DRIVE APPARATUS INCLUDING HOUSING WHICH CONTAINS OIL

(71) Applicant: Nidec Corporation, Kyoto (JP)

(72) Inventors: Yasuo Yamaguchi, Kyoto (JP); Yuki Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 173 days.

(21) Appl. No.: 16/323,636

(22) PCT Filed: Aug. 7, 2017

(86) PCT No.: PCT/JP2017/028602
§ 371 (c)(1),
(2) Date: Feb. 6, 2019

(87) PCT Pub. No.: WO2018/030347
PCT Pub. Date: Feb. 15, 2018

(65) Prior Publication Data
US 2019/0162181 A1    May 30, 2019

Related U.S. Application Data

(60) Provisional application No. 62/372,411, filed on Aug. 9, 2016, provisional application No. 62/402,027, filed (Continued)

(30) Foreign Application Priority Data

Mar. 31, 2017  (JP) .................................. 2017-073171

(51) Int. Cl.
*F04C 2/10* (2006.01)
*F04C 15/06* (2006.01)
(Continued)

(52) U.S. Cl.
CPC ................ *F04C 2/10* (2013.01); *F04C 15/06* (2013.01); *H02K 9/19* (2013.01); *F04C 2/102* (2013.01); *H02K 1/32* (2013.01); *H02K 7/14* (2013.01)

(58) Field of Classification Search
CPC .......... F04C 2/10; F04C 15/06; F04C 15/008; F04C 2/084; F04C 11/008; H02K 9/19
See application file for complete search history.

(56) References Cited

U.S. PATENT DOCUMENTS 6,039,551 A    3/2000  Takeuchi et al.
6,116,877 A    9/2000  Takeuchi et al.
(Continued)

FOREIGN PATENT DOCUMENTS

CN    102472271 A    5/2012
CN    105114302 A    12/2015
(Continued)

OTHER PUBLICATIONS

Yamaguchi et al., "Drive Device", U.S. Appl. No. 16/323,643, filed Feb. 6, 2019.
(Continued)

*Primary Examiner* — Deming Wan
(74) *Attorney, Agent, or Firm* — Keating & Bennett (57) ABSTRACT

A drive apparatus to be mounted on a vehicle includes a motor body including a rotor to rotate about a central axis extending in a horizontal direction perpendicular to a direction of travel of the vehicle, and a stator radially outside of the rotor, a housing including a housing portion to house the motor body, oil in a vertically lower region of the housing portion, and a pump to move the oil from the vertically lower region of the housing portion to feed the oil to the motor body. A liquid surface of the oil in the vertically lower region of the housing portion approaches the central axis to bring
(Continued)

the oil into contact with the rotor as a result of the vehicle being inclined forward or rearward in the direction of travel.

10 Claims, 5 Drawing Sheets

Related U.S. Application Data on Sep. 30, 2016, provisional application No. 62/439,201, filed on Dec. 27, 2016.

(51) Int. Cl.

| | | |
|---|---|---|
| *H02K 5/20* | (2006.01) | |
| *H02K 9/19* | (2006.01) | |
| *F04C 15/00* | (2006.01) | |
| *F04C 2/08* | (2006.01) | |
| *F04C 13/00* | (2006.01) | |
| *F16C 17/02* | (2006.01) | |
| *F16C 33/12* | (2006.01) | |
| *F16C 3/06* | (2006.01) | |
| *F16C 3/22* | (2006.01) | |
| *F01D 5/02* | (2006.01) | |
| *F02M 35/10* | (2006.01) | |
| *H02K 7/14* | (2006.01) | |
| *H02K 1/32* | (2006.01) | |

(56) References Cited

U.S. PATENT DOCUMENTS

| | | |
|---|---|---|
| 6,227,828 B1 | 5/2001 | Takeuchi et al. |
| 7,211,913 B2 | 5/2007 | Tsutsui et al. |
| 7,828,095 B2 | 11/2010 | Murata et al. |
| 8,970,075 B2 | 3/2015 | Rippel et al. |
| 9,441,628 B2 | 9/2016 | Sakata et al. |
| 9,762,106 B2 | 9/2017 | Gauthier et al. |
| 2004/0200350 A1 | 10/2004 | Makino et al. |
| 2007/0178292 A1 | 8/2007 | Hasegawa et al. |
| 2011/0156509 A1 | 6/2011 | Minemura et al. |
| 2012/0128513 A1 | 5/2012 | Sakata et al. |
| 2012/0230850 A1* | 9/2012 | Kawano .............. F04B 17/03 417/410.1 |
| 2012/0288380 A1* | 11/2012 | Kaiser .............. F04C 15/008 417/321 |
| 2013/0145879 A1 | 6/2013 | Nakamura et al. |
| 2014/0042841 A1* | 2/2014 | Rippel .............. H02K 1/20 310/54 |
| 2015/0180313 A1* | 6/2015 | Hayashi .............. H02K 16/005 310/54 |
| 2016/0153546 A1 | 6/2016 | Ogawa et al. |
| 2017/0227006 A1 | 8/2017 | Lewis et al. |

FOREIGN PATENT DOCUMENTS

| | | |
|---|---|---|
| JP | 62-29487 U | 2/1987 |
| JP | 2010-004603 A | 1/2010 |
| JP | 2010-252521 A | 11/2010 |
| JP | 2011-004487 A | 1/2011 |
| JP | 2013-055728 A | 3/2013 |
| JP | 2016-101042 A | 5/2016 |
| JP | 2016-181954 A | 10/2016 |
| JP | 2017-063542 A | 3/2017 |
| WO | 2016/033015 A1 | 3/2016 |

OTHER PUBLICATIONS

Migita et al., "Drive Device", U.S. Appl. No. 16/323,632, filed Feb. 6, 2019.
Yamaguchi et al., "Drive Apparatus", U.S. Appl. No. 16/323,633, filed Feb. 6, 2019.
Yamaguchi, "Drive Device", U.S. Appl. No. 16/323,638, filed Feb. 6, 2019.
Yamaguchi, "Drive Device", U.S. Appl. No. 16/323,640, filed Feb. 6, 2019.
Yamaguchi, "Drive Device", U.S. Appl. No. 16/323,641, filed Feb. 6, 2019.
Official Communication issued in International Patent Application No. PCT/JP2017/028602, dated Nov. 28, 2017.

\* cited by examiner

DRIVE APPARATUS INCLUDING HOUSING WHICH CONTAINS OIL

BACKGROUND OF THE INVENTION

1. Field of the Invention

The present disclosure relates to a drive apparatus.

2. Description of the Related Art

There is a known structure in which a cooling oil to cool a motor is gathered in a case arranged to house the motor to be used to cool the motor.

There is generally known a cooling system which is arranged to increase the feeding amount of a cooling oil in accordance with the rotation rate of a motor to perform efficient cooling. However, when a vehicle travels on an upward slope, the cooling of the motor may become insufficient because of a low rotation rate of the motor, although a high load is imposed on the motor.

SUMMARY OF THE INVENTION

A drive apparatus according to an example embodiment of the present disclosure is a drive apparatus to be mounted on a vehicle, the drive apparatus including a motor body including a rotor to rotate about a central axis extending in a horizontal direction perpendicular to a direction of travel of the vehicle, and a stator radially outside of the rotor; a housing including a housing portion to house the motor body; oil in a vertically lower region of the housing portion; and a pump to move the oil from the vertically lower region of the housing portion to feed the oil to the motor body. A liquid surface of the oil in the vertically lower region of the housing portion approaches the central axis to bring the oil into contact with the rotor as a result of the vehicle being inclined forward or rearward in the direction of travel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A z-axis direction indicated in each figure is a vertical direction Z with a positive side and a negative side being an upper side and a lower side, respectively. In the present embodiment, the vertical direction Z corresponds to an up-down direction in each figure. In the following description, the upper side and the lower side in the vertical direction will be referred to simply as an "upper side" and a "lower side", respectively.

Figure 1:
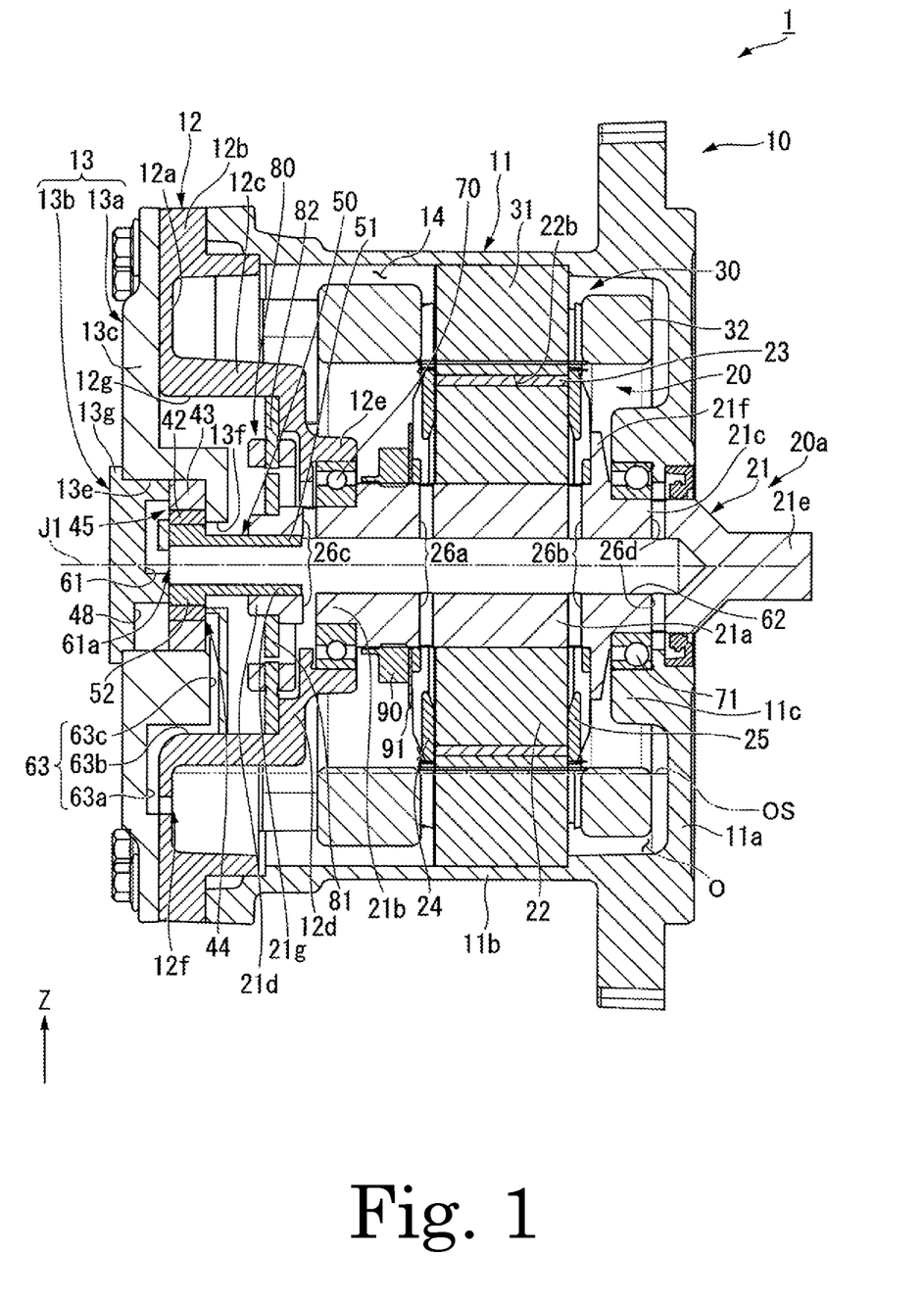
FIG. 1 is a sectional view illustrating a drive apparatus according to an example embodiment of the present disclosure.

Referring to FIG. 1, a drive apparatus 1 according to the present embodiment includes a housing 10, a rotor 20 including a motor shaft 20a arranged to extend along a central axis J1 extending in one direction, a rotation sensing portion 80, a stator 30, a pump portion 40, and bearings 70 and 71.

The central axis J1 extends in a left-right direction in FIG. 1. That is, the left-right direction in FIG. 1 corresponds to the one direction in the present embodiment. In the following description, a direction parallel to an axial direction of the central axis J1 is simply referred to by the term "axial direction", "axial", or "axially", radial directions centered on the central axis J1 are each simply referred to by the term "radial direction", "radial", or "radially", and a circumferential direction about the central axis J1 is simply referred to by the term "circumferential direction", "circumferential", or "circumferentially". In addition, a left side and a right side in the axial direction in FIG. 1 are referred to as a "first axial side" and a "second axial side", respectively.

The housing 10 includes a body portion 11, an inner cover portion 12, and an outer cover portion 13. In the present embodiment, the body portion 11, the inner cover portion 12, and the outer cover portion 13 are defined by separate members. The body portion 11 has a bottom and is tubular, and is arranged to open to the first axial side. The body portion 11 includes a bottom portion 11a, a tubular body portion 11b, and a bearing holding portion 11c. The bottom portion 11a is in the shape of an annular plate, extending radially. The tubular body portion 11b is cylindrical, and is arranged to extend to the first axial side from a radially outer edge portion of the bottom portion 11a. The bearing holding portion 11c is cylindrical, and is arranged to project to the first axial side from an inner edge portion of the bottom portion 11a. The bearing holding portion 11c is arranged to hold the bearing 71 with an inner circumferential surface thereof.

The inner cover portion 12 is attached to the body portion 11 on the first axial side. The inner cover portion 12 includes an annular plate portion 12a, an outer tubular portion 12b, an inner tubular portion 12c, an inner tube bottom portion 12d, and a bearing holding portion 12e. The annular plate portion 12a is in the shape of an annular plate, extending radially. The annular plate portion 12a is arranged to cover the stator 30 on the first axial side. That is, the inner cover portion 12 is arranged to cover the stator 30 on the first axial side. An opening portion 12f passing through the annular plate portion 12a in the axial direction is defined in a lower end portion of the annular plate portion 12a. The opening portion 12f is exposed to a housing portion 14, which will be described below.

The outer tubular portion 12b is cylindrical, and is arranged to extend to the second axial side from a radially outer edge portion of the annular plate portion 12a. An end portion of the outer tubular portion 12b on the second axial side is arranged to be in contact with and is fixed to an end portion of the tubular body portion 11b on the first axial side. The inner tubular portion 12c is cylindrical, and is arranged to extend to the second axial side from a radially inner edge portion of the annular plate portion 12a. The inner tube bottom portion 12d is annular, and is arranged to extend radially inward from an end portion of the inner tubular portion 12c on the second axial side. In the inner cover portion 12, a second recessed portion 12g, which is recessed to the second axial side from a surface of the inner cover portion 12 on the first axial side, is defined by the inner tubular portion 12c and the inner tube bottom portion 12d. That is, the inner cover portion 12 includes the second recessed portion 12g. The surface of the inner cover portion 12 on the first axial side refers to a surface of the annular plate portion 12a on the first axial side in the present embodiment. An inside surface of the second recessed portion 12g includes a radially inner surface of the inner tubular portion 12c and a surface of the inner tube bottom portion 12d on the first axial side.

The bearing holding portion 12e is cylindrical, and is arranged to project to the second axial side from a surface of the inner tube bottom portion 12d on the second axial side. The bearing holding portion 12e is arranged to hold the bearing 70 with an inner circumferential surface thereof. That is, the inner cover portion 12 is arranged to hold the bearing 70.

The housing portion 14, which is enclosed by the body portion 11 and the inner cover portion 12, is defined by the body portion 11 and the inner cover portion 12 being fixed to each other. That is, the housing 10 includes the housing portion 14. The housing portion 14 is arranged to house the rotor 20 and the stator 30, and to be capable of storing an oil O therein. The oil O is stored in a vertically lower region of the housing portion 14. It is assumed herein that the "vertically lower region of the housing portion" includes a portion of the housing portion which lies lower than a middle in the vertical direction Z.

In the present embodiment, a liquid surface OS of the oil O stored in the housing portion 14 lies higher than the opening portion 12f. The opening portion 12f is thus exposed to the oil O stored in the housing portion 14. The liquid surface OS of the oil O varies as the oil O is sucked up by the pump portion 40, but is arranged to lie lower than the rotor 20 at least when the rotor 20 is rotating. This contributes to preventing the oil O from providing resistance to rotation of the rotor 20 when the rotor 20 is rotating.

The outer cover portion 13 is attached to the inner cover portion 12 on the first axial side. The outer cover portion 13 includes an outer cover body portion 13a and a stopper body portion 13b. The outer cover body portion 13a is arranged to extend radially. The outer cover body portion 13a includes a cover plate portion 13c and a projecting portion 13d. The cover plate portion 13c is in the shape of a disk, extending radially. A radially outer edge portion of the cover plate portion 13c is fixed to the radially outer edge portion of the annular plate portion 12a. A surface of the cover plate portion 13c on the second axial side is arranged to be in contact with the surface of the annular plate portion 12a on the first axial side. The projecting portion 13d is arranged to project to the second axial side from a central portion of the cover plate portion 13c. The projecting portion 13d is inserted into the inner tubular portion 12c from the first axial side. The projecting portion 13d is arranged on the first axial side of the inner tube bottom portion 12d with a space therebetween.

The outer cover body portion 13a includes a first recessed portion 13e and a second through hole 13f. The first recessed portion 13e is recessed to the second axial side from a surface of the outer cover body portion 13a on the first axial side. The first recessed portion 13e is defined in a central portion of the outer cover body portion 13a, and is arranged to extend over both the cover plate portion 13c and the projecting portion 13d. The second through hole 13f is arranged to pass through from a bottom surface of the first recessed portion 13e to a surface of the projecting portion 13d on the second axial side. That is, the second through hole 13f is arranged to pass through from the bottom surface of the first recessed portion 13e into an interior of the housing 10. The second through hole 13f is arranged to open into an interior of the second recessed portion 12g. The second through hole 13f thus connects an interior of the first recessed portion 13e and the interior of the second recessed portion 12g. The central axis J1 passes through the second through hole 13f.

The stopper body portion 13b is fitted into the first recessed portion 13e to be fixed to the outer cover body portion 13a. The stopper body portion 13b is arranged to close an opening of the first recessed portion 13e on the first axial side. The stopper body portion 13b is arranged to cover the motor shaft 20a on the first axial side. That is, the outer cover portion 13 is arranged to cover the motor shaft 20a on the first axial side. The stopper body portion 13b includes a collar portion 13g arranged to project radially outward in an end portion thereof on the first axial side. The collar portion 13g is arranged to be in contact with a surface of the cover plate portion 13c on the first axial side. The stopper body portion 13b is thus positioned in the axial direction.

Figure 2:
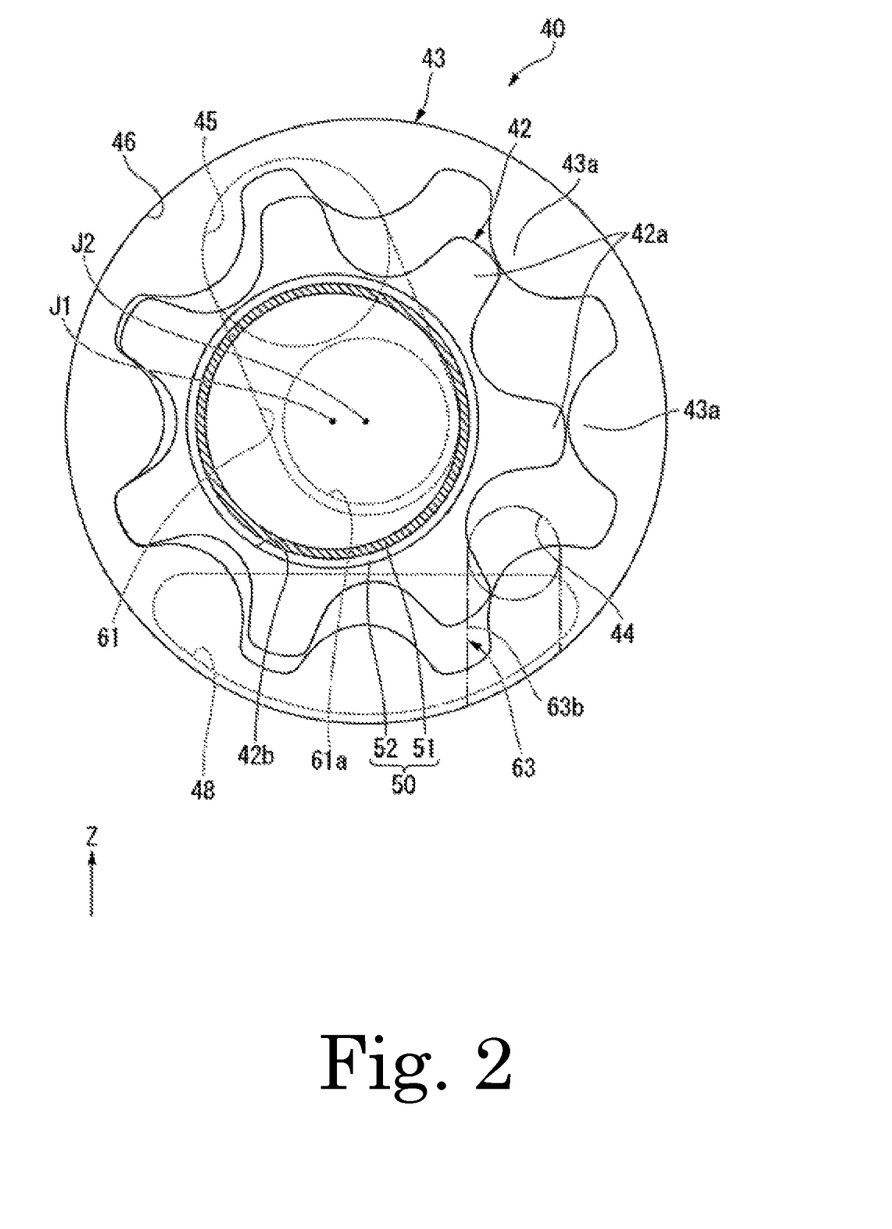
FIG. 2 is a diagram illustrating a pump portion according to an example embodiment of the present disclosure when viewed from a second axial side.

The outer cover portion 13 has a pump chamber 46 defined therein. The pump chamber 46 is defined axially between a surface of the stopper body portion 13b on the second axial side and the bottom surface of the first recessed portion 13e. In the present embodiment, a surface of the pump chamber 46 on the second axial side corresponds to the bottom surface of the first recessed portion 13e. A surface of the pump chamber 46 on the first axial side corresponds to the surface of the stopper body portion 13b on the second axial side. The pump chamber 46 is an end portion of the interior of the first recessed portion 13e on the second axial side. The pump chamber 46 is arranged radially inside of the inner tubular portion 12c, that is, in the interior of the second recessed portion 12g. The central axis J1 passes through the pump chamber 46. Referring to FIG. 2, the pump chamber 46 is arranged to have a circular external shape when viewed in the axial direction. The pump chamber 46 is arranged to house an internal gear 43 and an external gear 42, which will be described below.

Referring to FIG. 1, the housing 10 includes a first oil passage 61 and a third oil passage 63. The first oil passage 61 is defined in the outer cover portion 13. In more detail, the first oil passage 61 is defined in the stopper body portion 13b. Accordingly, the structure of the first oil passage 61 can be easily changed by changing the stopper body portion 13b. The first oil passage 61 is arranged on the first axial side of the pump chamber 46. The first oil passage 61 is arranged to connect an upper end portion of the pump chamber 46 and a central portion of the pump chamber 46 on the first axial side of the pump chamber 46. Portions of the first oil passage 61 which are connected to the pump chamber 46 are arranged to open in the surface of the stopper body portion 13b on the second axial side.

The upper end portion of the pump chamber 46 connected to the first oil passage 61 is a discharge outlet 45. That is, the first oil passage 61 is connected to the discharge outlet 45. The central portion of the pump chamber 46 connected to the first oil passage 61 is a connection opening 61a. Referring to FIG. 2, each of the discharge outlet 45 and the connection opening 61a is, for example, circular. The discharge outlet 45 is arranged higher than the connection opening 61a. The central axis J1 passes through the connection opening 61a.

Referring to FIG. 1, the third oil passage 63 is arranged to extend upward from the opening portion 12f. The third oil passage 63 is connected to the vertically lower region of the housing portion 14 through the opening portion 12f. An upper end portion of the third oil passage 63 is connected to the pump chamber 46 on the second axial side of the pump chamber 46. A portion of the pump chamber 46 to which the third oil passage 63 is connected is a suction inlet 44. That is, the third oil passage 63 is arranged to connect the suction inlet 44 and the vertically lower region of the housing portion 14. Referring to FIG. 2, the suction inlet 44 is, for example, circular. The suction inlet 44 is arranged lower than each of the discharge outlet 45 and the connection opening 61a. The suction inlet 44 is arranged lower than the central axis J1.

Referring to FIG. 1, the third oil passage 63 includes a first portion 63a, a second portion 63b, and a third portion 63c. The first portion 63a is arranged to extend upward from the opening portion 12f. An upper end portion of the first portion 63a is arranged higher than an inner peripheral surface of a lower end portion of the inner tubular portion 12c. The first portion 63a is defined, for example, by a groove extending in the vertical direction Z and recessed to the first axial side from the surface of the cover plate portion 13c on the second axial side being closed by the surface of the annular plate portion 12a on the first axial side. Thus, the first portion 63a is arranged axially between the inner cover portion 12 and the outer cover portion 13.

The second portion 63b is arranged to extend to the second axial side from the upper end portion of the first portion 63a. The second portion 63b is defined by a groove recessed upward from a lower surface of the projecting portion 13d and extending to the second axial side being closed by an inner circumferential surface of the inner tubular portion 12c. Thus, the second portion 63b is arranged radially between the inner cover portion 12 and the outer cover portion 13.

The third portion 63c is arranged to extend upward from an end portion of the second portion 63b on the second axial side. The third portion 63c is defined in the projecting portion 13d. The third portion 63c is arranged radially inside of the inner tubular portion 12c. The third portion 63c is connected to the suction inlet 44. In the present embodiment, at least a portion of the third oil passage 63 is arranged axially between the inner cover portion 12 and the outer cover portion 13. Thus, at least a portion of the third oil passage 63 can be defined by the inner cover portion 12 and the outer cover portion 13 fixed to each other, which makes it easy to make the third oil passage 63.

The rotor 20 includes the motor shaft 20a, a rotor core 22, magnets 23, a first end plate 24, and a second end plate 25. The motor shaft 20a includes a motor shaft body 21 and an attachment member 50. The motor shaft body 21 is columnar, extending in the axial direction. The motor shaft body 21 includes a large diameter portion 21a, a first medium diameter portion 21b, a second medium diameter portion 21c, a small diameter portion 21d, and an output portion 21e.

The large diameter portion 21a is a portion to which the rotor core 22 is attached. An outer circumferential surface of an end portion of the large diameter portion 21a on the first axial side includes a male screw portion defined therein. A nut 90 is screwed onto the male screw portion of the large diameter portion 21a. The first medium diameter portion 21b is continuous with the large diameter portion 21a on the first axial side of the large diameter portion 21a. The first medium diameter portion 21b is arranged to have an outside diameter smaller than an outside diameter of the large diameter portion 21a. An end portion of the first medium diameter portion 21b on the second axial side is rotatably supported by the bearing 70.

The second medium diameter portion 21c is continuous with the large diameter portion 21a on the second axial side of the large diameter portion 21a. The second medium diameter portion 21c is arranged to have an outside diameter smaller than the outside diameter of the large diameter portion 21a. An end portion of the second medium diameter portion 21c on the first axial side is rotatably supported by the bearing 71. The bearings 70 and 71 are arranged to rotatably support the motor shaft 20a. Each of the bearings 70 and 71 is, for example, a ball bearing.

The small diameter portion 21d is continuous with the first medium diameter portion 21b on the first axial side of the first medium diameter portion 21b. An end portion of the small diameter portion 21d on the first axial side corresponds to an end portion of the motor shaft body 21 on the first axial side. The end portion of the small diameter portion 21d on the first axial side is arranged radially inside of the inner tubular portion 12c. The small diameter portion 21d is arranged to have an outside diameter smaller than the outside diameter of the first medium diameter portion 21b. That is, the small diameter portion 21d is a portion having a decreased outside diameter on the first axial side.

The output portion 21e is continuous with the second medium diameter portion 21c on the second axial side of the second medium diameter portion 21c. The output portion 21e corresponds to an end portion of the motor shaft body 21 on the second axial side. The output portion 21e is arranged to have an outside diameter smaller than the outside diameter of the small diameter portion 21d. The output portion 21e is arranged to project outwardly of the housing 10 passing through the bottom portion 11a in the axial direction.

The motor shaft body 21 includes a flange portion 21f. The flange portion 21f is arranged to project radially outward from an outer circumferential surface of the large diameter portion 21a. The flange portion 21f is in the shape of an annular plate, extending all the way around the outer circumferential surface of the large diameter portion 21a. The flange portion 21f is arranged at an end portion of the large diameter portion 21a on the second axial side. The motor shaft body 21 includes a hole portion 21g arranged to extend to the second axial side from the end portion of the motor shaft body 21 on the first axial side. The hole portion 21g is a hole having a closed bottom and opening to the first axial side. That is, an end portion of the hole portion 21g on the second axial side is closed.

The attachment member 50 is fixed to the motor shaft body 21 on the first axial side. The attachment member 50 is fitted into the hole portion 21g to be fixed. The attachment member 50 is tubular, and is arranged to open to both axial sides. In the present embodiment, the attachment member 50 is cylindrical and is centered on the central axis J1. The attachment member 50 is arranged to extend farther to the first axial side than the motor shaft body 21 to pass through the second through hole 13f.

The attachment member 50 includes a fitting portion 51 and a fixing portion 52. The fitting portion 51 is a portion fitted into the hole portion 21g. The fitting portion 51 is fixed to an inner circumferential surface of an end portion of the hole portion 21g on the first axial side, and is arranged to extend from inside the hole portion 21g farther to the first axial side than the motor shaft body 21. An end portion of the fitting portion 51 on the first axial side is inserted in the second through hole 13f. That is, at least a portion of the fitting portion 51 is inserted in the second through hole 13f. Thus, a large radial gap can be defined between an outer circumferential surface of the attachment member 50 and an inner circumferential surface of the second through hole 13f. This contributes to preventing the attachment member 50 from coming into contact with the inner circumferential surface of the second through hole 13f even if a radial displacement of the attachment member 50 is caused by a vibration or the like.

The fixing portion 52 is arranged on the first axial side of the fitting portion 51. The fixing portion 52 is continuous with the end portion of the fitting portion 51 on the first axial side. The fixing portion 52 is arranged to have an outside diameter greater than an outside diameter of the fitting portion 51 and smaller than a diameter of the second through hole 13f. The fixing portion 52 is inserted into the pump chamber 46. The inside diameter of the fitting portion 51 and the inside diameter of the fixing portion 52 are arranged to be the same, for example.

The external gear 42, which will be described below, is fixed to the attachment member 50. In the present embodiment, the external gear 42 is fixed to a radially outer surface of the fixing portion 52. In more detail, the fixing portion 52 is fitted into and fixed in a fixing hole portion 42b passing through the external gear 42 in the axial direction. As described above, in the present embodiment, the fitting portion 51, which has an outside diameter smaller than that of the fixing portion 52, is fitted into the hole portion 21g, while the fixing portion 52, which has an outside diameter greater than that of the fitting portion 51, is fixed to the external gear 42. This allows the hole portion 21g to have a diameter smaller than a diameter of the fixing hole portion 42b of the external gear 42. This makes it easy for the hole portion 21g to have a relatively small diameter, which contributes to minimizing a reduction in rigidity of the motor shaft body 21.

The motor shaft 20a includes a second oil passage 62 defined in an interior of the motor shaft 20a. The second oil passage 62 is a hole portion having a closed bottom and arranged to be recessed and extend to the second axial side from an end portion of the motor shaft 20a on the first axial side. The second oil passage 62 is arranged to open to the first axial side. The second oil passage 62 is arranged to extend from an end portion of the attachment member 50 on the first axial side to an end portion of the second medium diameter portion 21c on the second axial side so as to extend over both the attachment member 50 and the motor shaft body 21. The second oil passage 62 is defined by an interior of the attachment member 50 and the hole portion 21g being connected to each other in the axial direction. That is, a radially inner surface of the attachment member 50 defines a portion of a radially inner surface of the second oil passage 62.

In the present embodiment, an inner edge of the second oil passage 62 is circular with the central axis J1 in a center in a cross-section perpendicular to the axial direction. The diameter of a portion of the second oil passage 62 which is defined in the attachment member 50 is smaller than the diameter of a portion of the second oil passage 62 which is defined in the motor shaft body 21. That is, the inside diameter of the attachment member 50 is smaller than the diameter of the hole portion 21g. An opening of the attachment member 50 on the first axial side is connected to the connection opening 61a, so that the second oil passage 62 is connected to the first oil passage 61 through the interior of the attachment member 50. That is, the second oil passage 62 is arranged to open into the first oil passage 61 at the end portion of the motor shaft 20a on the first axial side.

Figure 3:
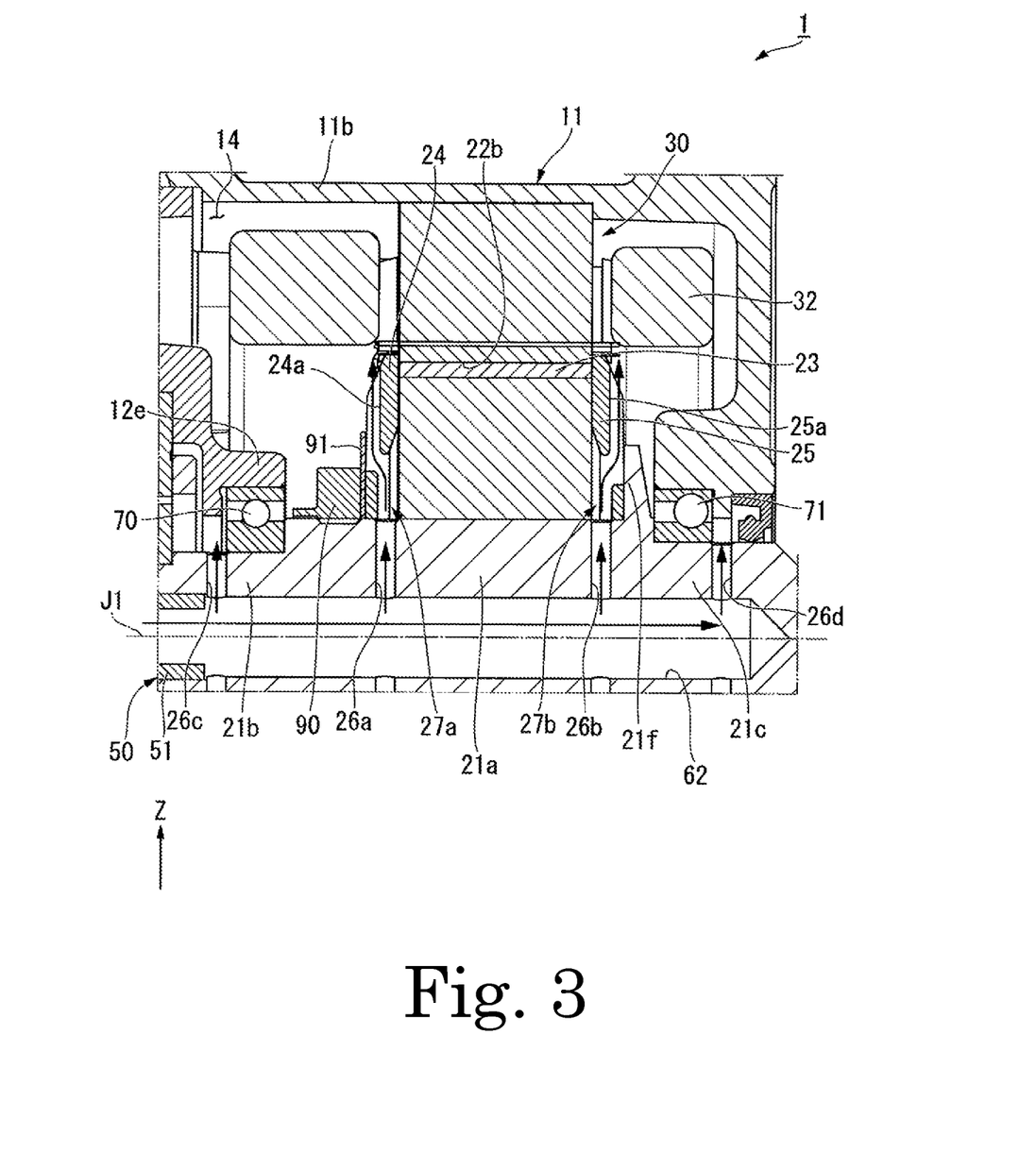
FIG. 3 is a sectional view illustrating a portion of the drive apparatus according to an example embodiment of the present disclosure.

The motor shaft 20a includes first through holes 26a, 26b, 26c, and 26d each of which is arranged to connect the second oil passage 62 to an outer circumferential surface of the motor shaft 20a. Each of the first through holes 26a to 26d is arranged to extend in a radial direction. Each of the first through holes 26a and 26b is defined in the large diameter portion 21a. Each of the first through holes 26a and 26b is arranged axially between the nut 90 and the flange portion 21f. Referring to FIG. 3, a radially outer end portion of each first through hole 26a is arranged to open into an axial gap 27a between the first end plate 24 and the rotor core 22. A radially outer end portion of each first through hole 26b is arranged to open into an axial gap 27b between the second end plate 25 and the rotor core 22.

Each first through hole 26c is defined in the first medium diameter portion 21b. A radially outer end portion of the first through hole 26c is arranged to open into a gap radially inside of the bearing holding portion 12e on the first axial side of the bearing 70. Each first through hole 26d is defined in the second medium diameter portion 21c. A radially outer end portion of the first through hole 26d is arranged to open into a gap radially inside of the bearing holding portion 11c on the second axial side of the bearing 71. The first through holes 26a, 26b, 26c, and 26d are each more than one in number, and are each arranged along a circumferential direction, for example.

Referring to FIG. 1, the rotor core 22 is annular, and is fixed to the motor shaft body 21. In the present embodiment, the rotor core 22 is fitted to the large diameter portion 21a. The rotor core 22 includes a plurality of magnet insert holes 22b each of which is arranged to pass through the rotor core 22 in the axial direction. The plurality of magnet insert holes 22b are arranged along the circumferential direction. The magnets 23 are inserted into the magnet insert holes 22b.

Each of the first end plate 24 and the second end plate 25 is in the shape of an annular plate, extending radially. The large diameter portion 21a is arranged to pass through each of the first end plate 24 and the second end plate 25. The rotor core 22 is held axially between the first end plate 24 and the second end plate 25, with each of the first end plate 24 and the second end plate 25 being in contact with the rotor core 22.

Referring to FIG. 3, the first end plate 24 is arranged on the first axial side of the rotor core 22. A radially outer edge portion of the first end plate 24 is arranged to project to the second axial side to be in contact with a radially outer edge portion of a surface of the rotor core 22 on the first axial side. The radially outer edge portion of the first end plate 24 is arranged to axially overlap with an opening portion of each magnet insert hole 22b on the first axial side to hold the magnet 23 inserted in each magnet insert hole 22b from the first axial side. A portion of the first end plate 24 which lies radially inward of the radially outer edge portion thereof is arranged axially opposite to the surface of the rotor core 22 on the first axial side with the gap 27a therebetween.

The first end plate 24 includes an emitting groove 24a recessed to the second axial side from a surface of the first end plate 24 on the first axial side. The emitting groove 24a is arranged to extend in a radial direction. A radially inner end portion of the emitting groove 24a is arranged to pass through the first end plate 24 in the axial direction to be connected to the gap 27a. A radially outer end portion of the emitting groove 24a is arranged to open radially outwardly of the first end plate 24, and is arranged to be radially opposed to coils 32, which will be described below, with a gap therebetween. An opening of a radially inner portion of the emitting groove 24a on the first axial side is closed by a washer 91, which is fixed by being held axially between the nut 90 and the first end plate 24. The washer 91 is in the shape of an annular plate, extending radially.

The second end plate 25 is arranged on the second axial side of the rotor core 22. A radially outer edge portion of the second end plate 25 is arranged to project to the first axial side to be in contact with a radially outer edge portion of a surface of the rotor core 22 on the second axial side. The radially outer edge portion of the second end plate 25 is arranged to axially overlap with an opening portion of each magnet insert hole 22b on the second axial side to hold the magnet 23 inserted in each magnet insert hole 22b from the second axial side. Thus, the magnet 23 inserted in each magnet insert hole 22b is held on both axial sides by the first end plate 24 and the second end plate 25. This contributes to preventing each magnet 23 from coming out of the corresponding magnet insert hole 22b.

A portion of the second end plate 25 which lies radially inward of the radially outer edge portion thereof is arranged axially opposite to the surface of the rotor core 22 on the second axial side with the gap 27b therebetween. The second end plate 25 includes an emitting groove 25a recessed to the first axial side from a surface of the second end plate 25 on the second axial side. The emitting groove 25a is arranged to extend in a radial direction. A radially inner end portion of the emitting groove 25a is arranged to pass through the second end plate 25 in the axial direction to be connected to the gap 27b. A radially outer end portion of the emitting groove 25a is arranged to open radially outwardly of the second end plate 25, and is arranged to be radially opposed to the coils 32, which will be described below, with a gap therebetween. An opening of a radially inner portion of the emitting groove 25a on the second axial side is closed by the flange portion 21f.

The first end plate 24, the rotor core 22, and the second end plate 25 are held axially between a combination of the nut 90 and the washer 91 and the flange portion 21f. The nut 90 is screwed onto the male screw portion of the large diameter portion 21a, so that the nut 90 presses the first end plate 24, the rotor core 22, and the second end plate 25 against the flange portion 21f with the washer 91 intervening between the nut 90 and the first end plate 24. Thus, each of the first end plate 24, the rotor core 22, and the second end plate 25 is fixed to the motor shaft 20a.

The rotation sensing portion 80 illustrated in FIG. 1 is arranged to sense the rotation of the rotor 20. In the present embodiment, the rotation sensing portion 80 is, for example, a variable reluctance (VR) resolver. The rotation sensing portion 80 is arranged radially inside of the inner tubular portion 12c. The rotation sensing portion 80 includes a sensed portion 81 and a sensor portion 82.

The sensed portion 81 is annular, extending in the circumferential direction. The sensed portion 81 is fitted and fixed to the motor shaft 20a. In more detail, the sensed portion is fitted and fixed to the small diameter portion 21d. A surface of a radially inner edge portion of the sensed portion 81 on the second axial side is arranged to be in contact with a shoulder at a boundary between the first medium diameter portion 21b and the small diameter portion 21d. The sensed portion 81 is arranged to radially overlap with the attachment member 50. This arrangement makes it easier to reduce the axial dimension of the motor shaft 20a than in the case where the sensed portion 81 and the attachment member 50 are arranged axially apart from each other without radially overlapping with each other. The sensed portion 81 is made of a magnetic material.

Note that, when objects are herein described as "overlapping with each other in a given direction", it may mean that the objects overlap with each other when viewed along the given direction. That is, when the sensed portion 81 and the attachment member 50 are described as radially overlapping with each other, it may mean that the sensed portion 81 and the attachment member 50 overlap with each other when viewed along a radial direction.

The sensor portion 82 is arranged axially between the inner cover portion 12 and the outer cover portion 13. In more detail, the sensor portion 82 is fixed to the surface of the inner tube bottom portion 12d on the first axial side on a radially inner side of the inner tubular portion 12c. That is, the sensor portion 82 is attached to the inner cover portion 12. Thus, attachment of the sensor portion 82 can be easily accomplished. The sensor portion 82 is arranged in the second recessed portion 12g. Therefore, it is possible to insert the sensor portion 82 into the second recessed portion 12g through an opening of the second recessed portion 12g on the first axial side to arrange the sensor portion 82 therein after the inner cover portion 12 is attached to the body portion 11. Thus, the arrangement of the sensor portion 82 can be easily accomplished.

The sensor portion 82 is annular, surrounding the sensed portion 81 on a radially outer side thereof. The sensor portion 82 includes a plurality of coils arranged along the circumferential direction. As a result of the sensed portion 81 rotating together with the motor shaft 20a, an induced voltage is generated in the coils of the sensor portion 82 in accordance with the circumferential position of the sensed portion 81. The sensor portion 82 senses the rotation of the sensed portion 81 by sensing the induced voltage. Thus, the rotation sensing portion 80 senses the rotation of the rotor 20 by sensing the rotation of the motor shaft 20a.

The stator 30 is arranged radially opposite to the rotor 20 with a gap therebetween. The stator 30 includes a stator core 31 and the coils 32 attached to the stator core 31. The stator core 31 is annular, and is centered on the central axis J1. An outer circumferential surface of the stator core 31 is fixed to an inner circumferential surface of the tubular body portion 11b. The stator core 31 is arranged radially outside of and opposite to the rotor core 22 with a gap therebetween.

The pump portion 40 is arranged in a central portion of the outer cover portion 13. The pump portion 40 is arranged on the first axial side of the motor shaft 20a. The pump portion 40 includes the external gear 42, the internal gear 43, the aforementioned pump chamber 46, the suction inlet 44, the discharge outlet 45, and a storage portion 48. The external gear 42 is a gear arranged to be capable of rotating about the central axis J1. The external gear 42 is fixed to the end portion of the motor shaft 20a on the first axial side. In more detail, the external gear 42 is fixed to an outer circumferential surface of the fixing portion 52. Accordingly, the external gear 42 can be fixed to the motor shaft body 21 with the attachment member 50 intervening therebetween. Thus, the external gear 42 can be fixed to the motor shaft body 21 by adjusting the dimensions of the attachment member 50 without changing the dimensions of the motor shaft body 21 or the dimensions of the external gear 42.

The external gear 42 is housed in the pump chamber 46. Referring to FIG. 2, the external gear 42 includes a plurality of tooth portions 42a in an outer circumferential surface thereof. The tooth portions 42a of the external gear 42 are arranged to have a trochoid tooth profile.

The internal gear 43 is an annular gear arranged to be capable of rotating about a rotation axis J2 eccentric with respect to the central axis J1. The internal gear 43 is housed in the pump chamber 46. The internal gear 43 is arranged to surround the external gear 42 on the radially outer side thereof, and is arranged to mesh with the external gear 42. The internal gear 43 includes a plurality of tooth portions 43a in an inner circumferential surface thereof. The tooth portions 43a of the internal gear 43 are arranged to have a trochoid tooth profile. Thus, a trochoid pump can be defined because of the trochoid tooth profile of the tooth portions 42a of the external gear 42 and the trochoid tooth profile of the tooth portions 43a of the internal gear 43. This leads to a reduction in noise generated from the pump portion 40, and makes it easier to stabilize the pressure and amount of the oil O discharged from the pump portion 40.

In the present embodiment, the internal gear 43 and the external gear 42 are inserted into the first recessed portion 13e through the opening of the first recessed portion 13e on the first axial side, and then, the opening of the first recessed portion 13e on the first axial side is closed by the stopper body portion 13b, whereby the pump chamber 46 is defined, and the internal gear 43 and the external gear 42 are housed in the pump chamber 46. The pump portion 40 can thus be easily assembled.

As described above, the suction inlet 44 is connected to the third oil passage 63. As illustrated in FIG. 1, the suction inlet 44 is arranged to open to the second axial side in the pump chamber 46. The suction inlet 44 is connected to a gap between the external gear 42 and the internal gear 43. The suction inlet 44 is arranged to be capable of sucking the oil O stored in the housing portion 14 into the pump chamber 46, more specifically into the gap between the external gear 42 and the internal gear 43, through the opening portion 12f and the third oil passage 63. Referring to FIG. 2, the suction inlet 44 is arranged higher than a lower end portion of the storage portion 48 and higher than a lower end portion of the external gear 42.

As described above, the discharge outlet 45 is connected to the first oil passage 61. Referring to FIG. 1, the discharge outlet 45 is arranged to open to the first axial side in the pump chamber 46. The discharge outlet 45 is connected to the gap between the external gear 42 and the internal gear 43. The discharge outlet 45 is arranged to be capable of discharging the oil O from inside the pump chamber 46, more specifically from inside the gap between the external gear 42 and the internal gear 43.

The storage portion 48 is connected to the pump chamber 46 on the first axial side of a vertically lower region of the pump chamber 46. Referring to FIG. 2, the storage portion 48 is in the shape of a bow being convex downward when viewed in the axial direction. A portion of the oil O sucked into the pump chamber 46 through the suction inlet 44 flows into the storage portion 48.

Since the suction inlet 44 is arranged higher than the lower end portion of the storage portion 48, at least a portion of the oil O which has flowed into the storage portion 48 is stored in the storage portion 48 without returning into the housing portion 14 through the suction inlet 44 even when the pump portion 40 is at rest. Thus, a lower portion of the external gear 42 and a lower portion of the internal gear 43 in the pump chamber 46 can stay in contact with the oil O in the storage portion 48 while the pump portion 40 is at rest. Accordingly, when the pump portion 40 is driven again, the oil O can be caused to intervene between the tooth portions 42a of the external gear 42 and the tooth portions 43a of the internal gear 43 and between an inner circumferential surface of the pump chamber 46 and an outer circumferential surface of the internal gear 43 to prevent a seizure.

Once the motor shaft 20a rotates along with the rotation of the rotor 20, the external gear 42, which is fixed to the motor shaft 20a, rotates. As a result, the internal gear 43, which meshes with the external gear 42, rotates to cause the oil O sucked into the pump chamber 46 through the suction inlet 44 to be sent to the discharge outlet 45 through the gap between the external gear 42 and the internal gear 43. The pump portion 40 is arranged to be driven through the motor shaft 20a in the above-described manner. After being discharged through the discharge outlet 45, the oil O flows into the first oil passage 61, and flows into the second oil passage 62 through the connection opening 61a. As indicated by an arrow in FIG. 3, after flowing into the second oil passage 62, the oil O receives a radially outward force due to a centrifugal force of the rotating motor shaft 20a, and flows out of the motor shaft 20a through the first through holes 26a to 26d.

In the present embodiment, each first through hole 26a is arranged to open into the axial gap 27a between the first end plate 24 and the rotor core 22, and therefore, a portion of the oil O which has flowed out through the first through hole 26a flows into the gap 27a. After flowing into the gap 27a, the oil O is emitted radially outward through the emitting groove 24a. In the present embodiment, the opening of the radially inner portion of the emitting groove 24a on the first axial side is closed by the washer 91, and thus, a portion of the oil O which has flowed into the emitting groove 24a is easily guided radially outward by the washer 91.

Each first through hole 26b is arranged to open into the axial gap 27b between the second end plate 25 and the rotor core 22, and therefore, a portion of the oil O which has flowed out through the first through hole 26b flows into the gap 27b. After flowing into the gap 27b, the oil O is emitted radially outward through the emitting groove 25a. In the present embodiment, the opening of the radially inner portion of the emitting groove 25a on the second axial side is closed by the flange portion 21f, and thus, a portion of the oil O which has flowed into the emitting groove 25a is easily guided radially outward by the flange portion 21f.

A portion of the oil O which has been emitted radially outward through each of the emitting grooves 24a and 25a is blown onto the coils 32. Thus, the coils 32 can be cooled by the oil O. In the present embodiment, the second oil passage 62 is defined in the interior of the motor shaft 20a, and therefore, the oil O is able to cool the rotor 20 before being emitted through each of the emitting grooves 24a and 25a. In the present embodiment, the oil O, which is discharged through the discharge outlet 45, is led to the rotor 20 and the stator 30 in the above-described manner.

Since each first through hole 26c is arranged to open into the gap radially inside of the bearing holding portion 12e, a portion of the oil O which has flowed out through the first through hole 26c is fed to the bearing 70. Since each first through hole 26d is arranged to open into the gap radially inside of the bearing holding portion 11c, a portion of the oil O which has flowed out through the first through hole 26d is fed to the bearing 71. Thus, the oil O can be used as a lubricant for the bearings 70 and 71.

Note that, although FIG. 3 illustrates an example in which the oil O is emitted upward through each of the emitting grooves 24a and 25a, the present invention is not limited to this. Because the rotor 20 rotates, the circumferential position of each of the emitting grooves 24a and 25a varies in accordance with the rotation of the rotor 20. Accordingly, the direction in which the oil O is emitted through each of the emitting grooves 24a and 25a varies along the circumferential direction, so that the coils 32 arranged along the circumferential direction can be cooled by the oil O.

As described above, the pump portion 40 can be driven by the rotation of the motor shaft 20a, and the oil O stored in the housing 10 can be sucked up by the pump portion 40 to be fed to the rotor 20, the stator 30, and the bearings 70 and 71. Thus, the oil O stored in the housing 10 can be used to cool the rotor 20 and the stator 30, and to improve lubricity between the motor shaft body 21 and each of the bearings 70 and 71. The oil O fed to each of the stator 30 and the bearings 70 and 71 falls in the housing portion 14, and is stored in the lower region of the housing portion 14 again. Circulation of the oil O in the housing portion 14 can thus be achieved.

According to the present embodiment, provision of the first oil passage 61 and the second oil passage 62 enables the oil O discharged through the discharge outlet 45 to be sent to the interior of the motor shaft 20a. In addition, provision of the first through holes 26a to 26d enables the oil O which has flowed into the second oil passage 62 to be fed to each of the stator 30 and the bearings 70 and 71.

In addition, in the present embodiment, the second oil passage 62 defined in the motor shaft 20a is arranged to open into the first oil passage 61, which is connected to the discharge outlet 45, at the end portion of the motor shaft 20a on the first axial side. Since the external gear 42 is fixed to the end portion of the motor shaft 20a on the first axial side, the end portion of the motor shaft 20a on the first axial side is arranged relatively close to the discharge outlet 45. This leads to a reduced length of the first oil passage 61, which is arranged to connect the discharge outlet 45 and the second oil passage 62. Thus, according to the present embodiment, a reduction in the length of an oil passage from the opening portion 12f to the second oil passage 62 can be easily achieved. This makes it easier to send the oil O to the second oil passage 62, which is defined in the interior of the motor shaft 20a. In addition, the structure of the drive apparatus 1 can be easily simplified to make it easier to manufacture the drive apparatus 1.

In addition, according to the present embodiment, the radially inner surface of the attachment member 50 defines a portion of the radially inner surface of the second oil passage 62. This allows the oil O to flow into the second oil passage 62 through the attachment member 50 with the external gear 42 being fixed to the attachment member 50. Thus, as described above, the motor shaft body 21 and the external gear 42 can be fixed to each other with the attachment member 50 intervening therebetween without changing the dimensions of the motor shaft body 21 or the dimensions of the external gear 42, and the second oil passage 62 can be easily caused to open into the first oil passage 61.

The present invention is not limited to the above-described embodiment, and other structures may be adopted in other embodiments of the present invention. The external gear 42 may alternatively be directly fixed to the motor shaft body 21 without the attachment member 50 intervening therebetween. In this case, the second oil passage 62 may be defined only in an interior of the motor shaft body 21, for example. Also note that the attachment member 50 may alternatively be fixed to an outer circumferential surface of the motor shaft body 21.

Also note that the attachment member 50 may alternatively be a member that has a uniform outside diameter throughout its axial extent. In other words, the fitting portion 51 and the fixing portion 52 may alternatively be arranged to have the same outside diameter. In this case, the outside diameter of the fixing portion 52 may be reduced to the outside diameter of the fitting portion 51 illustrated in FIG. 1, for example, and this will make it possible to reduce the outside diameter of the external gear 42, to which the fixing portion 52 is fixed. This, in turn, will make it possible to reduce the outside diameter of the internal gear 43, resulting in a reduced inside diameter of the pump chamber 46. This, in turn, will make it possible to reduce the outside diameter of the projecting portion 13d, in which the pump chamber 46 is defined, to enlarge a radial space between a radially outer surface of the projecting portion 13d and an inner circumferential surface of the second recessed portion 12g. As a result, a portion of the sensor portion 82 which projects to the first axial side, for example, can be arranged in the radial space between the radially outer surface of the projecting portion 13d and the inner circumferential surface of the second recessed portion 12g, and the sensor portion 82 can be arranged closer to the outer cover portion 13. This will make it easier to reduce the axial dimension of the drive apparatus 1 as a whole. Note that the portion of the sensor portion 82 which projects to the first axial side may be, for example, the coils of the sensor portion 82.

Also note that the attachment member 50 may alternatively be defined by two or more separate members. In this case, the attachment member 50 may include a first tubular member to be fitted into the hole portion 21g, and a second tubular member to be fitted to the first tubular member and arranged to extend farther to the first axial side than the motor shaft body 21. In this case, the external gear 42 is fixed to an end portion of the second tubular member on the first axial side.

In addition, in the above-described embodiment, the portion of the attachment member 50 which is arranged to pass through the second through hole 13f is the fitting portion 51, which is arranged to have an outside diameter smaller than that of the fixing portion 52. Accordingly, the second through hole 13f may alternatively be arranged to have a diameter smaller than the outside diameter of the fixing portion 52 to make the radial gap between the outer circumferential surface of the attachment member 50 and the inner circumferential surface of the second through hole 13f relatively small. This contributes to preventing the oil O in the pump chamber 46 from leaking through the second through hole 13f. In the case where this structure is adopted, an assembler attaches the outer cover portion 13 to the inner cover portion 12, and thereafter inserts the fitting portion 51 into the second through hole 13f through the opening of the first recessed portion 13e on the left side, and fits the fitting portion 51 into the hole portion 21g of the motor shaft body 21, so that the attachment member 50 is fixed to the motor shaft body 21.

In addition, a reduced size of the second through hole 13f will make it possible to arrange a radially inner end portion of a closing portion that closes an opening of the pump chamber 46 on the second axial side more radially inward. The closing portion that closes the opening of the pump chamber 46 on the second axial side corresponds to a portion of the projecting portion 13d which lies radially outside of the second through hole 13f in the present embodiment. When the radially inner end portion of the closing portion can be arranged more radially inward, the opening of the pump chamber 46 on the second axial side can be properly closed by the closing portion even if each of the outside diameter of the external gear 42 and the outside diameter of the internal gear 43 is reduced. Therefore, the inside diameter of the pump chamber 46 can be reduced. Accordingly, as described above, a portion of the sensor portion 82 can be arranged in the radial space between the radially outer surface of the projecting portion 13d and the inner circumferential surface of the second recessed portion 12g, and this makes it easier to reduce the axial dimension of the drive apparatus 1.

The rotor core 22 may be fixed to the outer circumferential surface of the motor shaft body 21 through, for example, press fitting. In this case, the first end plate 24 and the second end plate 25 may be omitted. In addition, in this case, a portion of the oil O which has flowed out through each of the first through holes 26a and 26b may be directly fed to the coils 32, or alternatively, holes connected to the first through holes 26a may be defined in the rotor core 22, and the oil O may be fed to the coils 32 through the holes of the rotor core 22. Also note that the oil O may be fed to the stator core 31.

Also note that the oil O discharged through the discharge outlet 45 may be fed to any desired place, and may be fed to, for example, only one or two of the rotor 20, the stator 30, and the bearings 70 and 71, or to none of the above. The oil O discharged through the discharge outlet 45 may be fed to, for example, an inside surface of a vertically upper region of the housing portion 14. In this case, the stator 30 can be indirectly cooled through the housing 10 being cooled. Also note that one or more of the first through holes 26a to 26d may be omitted. The tooth portions 42a of the external gear 42 and the tooth portions 43a of the internal gear 43 may alternatively be arranged to have a cycloidal tooth profile or an involute tooth profile.

Figure 4:
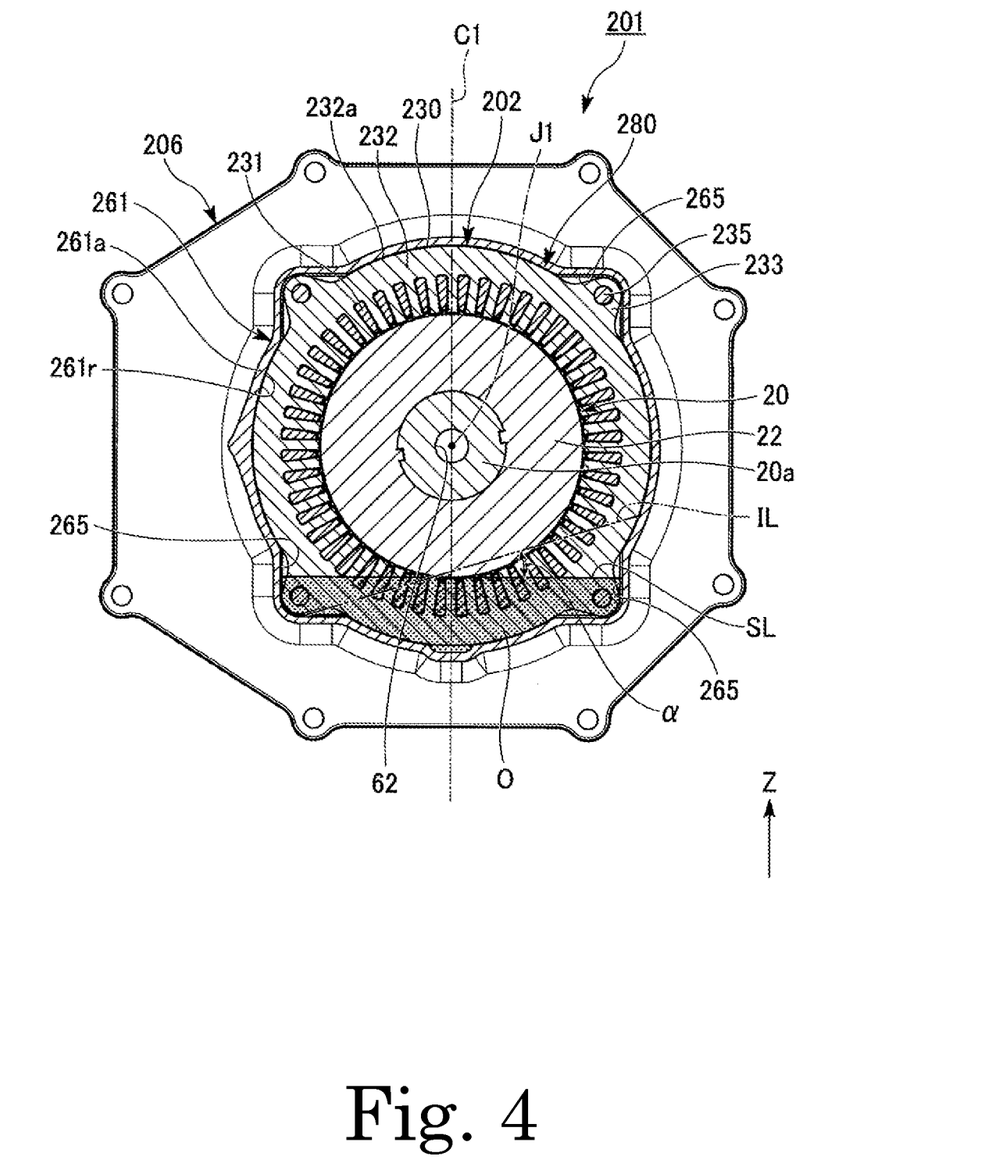
FIG. 4 is a sectional view of a drive apparatus according to a first modification of an example embodiment of the present disclosure.
Figure 5:
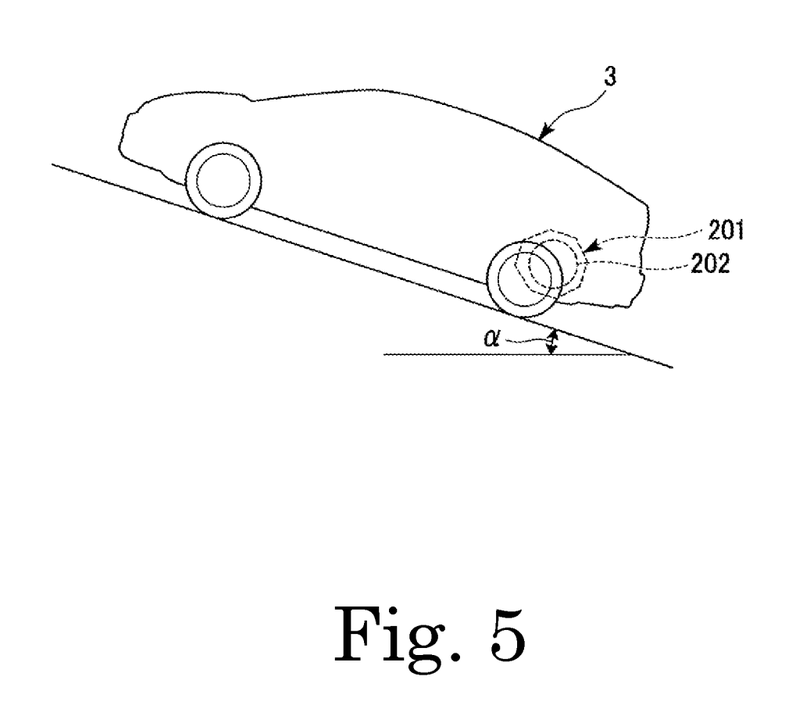
FIG. 5 is a side view of a vehicle on which the drive apparatus according to the first modification is installed.

FIG. 4 is a sectional view of a drive apparatus 201 according to a first modification. FIG. 5 is a side view of a vehicle 3 on which the drive apparatus 201 is installed. In FIG. 5, the vehicle 3 travels upward on a road surface inclined at an inclination angle α.

A change in a liquid surface of an oil in a housing portion 280 when the vehicle 3 has been inclined forward or rearward in a direction of travel will be described in a description of the first modification. Note that, in the following description, elements that have their equivalents in the above-described embodiment are denoted by the same reference characters as those of their equivalents in the above-described embodiment.

Referring to FIG. 4, the drive apparatus 201 according to the present modification includes a housing 206, a rotor 20 including a motor shaft 20a arranged to extend along a central axis J1 extending in one direction, a stator 230, and an oil O. In addition, the drive apparatus 201 according to the present modification includes a rotation sensing portion 80, a pump portion 40, and bearings 70 and 71, which are not shown in FIG. 4.

In addition, referring to FIG. 5, the drive apparatus 201 is mounted on the vehicle 3. The drive apparatus 201 is connected to axles through a reduction gear and a differential. The drive apparatus 201 is arranged to drive the axles through the reduction gear and the differential. In addition, the central axis J1 is arranged to extend in a horizontal direction perpendicular to the direction of travel of the vehicle.

The rotor 20 illustrated in FIG. 4 is arranged to rotate about the central axis J1. As in the above-described embodiment, a second oil passage 62 is defined in an interior of the motor shaft 20a of the rotor 20. The stator 230 is arranged radially outside of the rotor 20. The stator 230 is arranged radially opposite to the rotor 20 with a gap (i.e., an air gap) therebetween. The rotor 20 and the stator 230 together define a motor body 202. That is, the drive apparatus 201 includes the motor body 202.

The housing 206 is arranged to define the housing portion 280 therein. The motor body 202 is housed in the housing portion 280. In addition, the oil O is gathered in a vertically lower region of the housing portion 280. The pump portion 40 is arranged to lift the oil O from the vertically lower region of the housing portion 280 to feed the oil O to the motor body 202.

The stator 230 includes a stator core 232 and coils 231. The stator core 232 is defined by laminated silicon steel sheets. The stator core 232 is arranged to have a circular external shape when viewed in the axial direction. An outer circumferential surface 232a of the stator core 232 includes four projecting portions 233 each of which is arranged to project radially outward. The four projecting portions 233 are arranged at regular intervals in a circumferential direction about the central axis J1. A fixing screw 235 is inserted into each projecting portion 233. The fixing screw 235 is arranged to extend along the axial direction. In addition, the fixing screws 235 are arranged to fix the stator core 232 to an inside surface of the housing 206.

The housing 206 includes a lateral wall portion 261a arranged to surround the motor body 202 on the radially outer side thereof. The lateral wall portion 261a includes an inner circumferential surface 261r arranged radially outside of and opposite to an outer circumferential surface of the stator 230 of the motor body 202. The inner circumferential surface 261r is substantially circular when viewed in the axial direction. That is, the inner circumferential surface 261r is substantially circular, and is arranged to surround the motor body 202 on the radially outer side thereof. The inner circumferential surface 261r includes four lateral wall recessed portions 265 each of which is recessed radially outward. The four lateral wall recessed portions 265 are arranged at regular intervals in the circumferential direction about the central axis J1. In addition, the four lateral wall recessed portions 265 are arranged to be symmetrical with respect to a reference line C1 extending in the vertical direction and passing through the central axis J1, with two of the lateral wall recessed portions 265 being arranged on either side of the reference line C1. The projecting portions 233 of the stator core 232 are housed in the lateral wall recessed portions 265. In addition, two of the four lateral wall recessed portions 265 on the lower side are arranged lower than a lower end of the rotor 20. Note that each lateral wall recessed portion 265 may have any structure that enlarges a gap between the motor body 202 (i.e., the outer circumferential surface of the stator core 232) and the inner circumferential surface 261r.

Note that the inner circumferential surface 261r of the housing 206 may not necessarily be circular as long as it surrounds the motor body 202 on the radially outer side thereof and is shaped to extend along the stator.

The oil O is gathered in the vertically lower region of the housing portion 280. Here, a condition in which the vehicle is on a horizontal road surface will be referred to as a horizontal condition, whereas a condition in which the vehicle 3 is inclined forward or rearward in the direction of travel will be referred to as an inclined condition. In FIG. 4, a horizontal-condition liquid surface SL of the oil O gathered in the vertically lower region of the housing portion 280 in the horizontal condition, and an inclined-condition liquid surface IL of the oil O gathered in the vertically lower region of the housing portion 280 in the inclined condition, are depicted. That is, the horizontal-condition liquid surface SL is a liquid surface of the oil O gathered in the vertically lower region of the housing portion 280 when the vehicle 3 is traveling on a horizontal road surface. Meanwhile, the inclined-condition liquid surface IL is a liquid surface of the oil O when the vehicle 3 is inclined forward or rearward in the direction of travel.

The liquid surface of the oil O gathered in the vertically lower region of the housing portion 280 varies as the oil O is fed to the motor body 202 by the pump portion 40. It is assumed here that each of the horizontal-condition liquid surface SL and the inclined-condition liquid surface IL is a liquid surface of the oil O at a maximum level. Therefore, the horizontal-condition liquid surface SL and the inclined-condition liquid surface IL are liquid surfaces at the maximum level in the horizontal condition and the inclined condition, respectively.

The horizontal-condition liquid surface SL lies lower than the lower end of the rotor 20 and higher than a lower end of the stator 230. A reduction in the likelihood that the oil O will reduce rotation efficiency of the rotor 20 can be achieved by arranging the horizontal-condition liquid surface SL to lie lower than the lower end of the rotor 20. In addition, the stator 230 can be cooled by the oil O when the horizontal-condition liquid surface SL is arranged to lie higher than the lower end of the stator 230. Note that the horizontal-condition liquid surface SL is preferably arranged to pass through the air gap between the rotor 20 and the stator 230. This arrangement enables the stator 230 to soak in the oil O to a maximum degree to increase efficiency in cooling the stator 230 while preventing a reduction in the rotation efficiency of the rotor 20.

In the horizontal condition, two of the four lateral wall recessed portions 265 which lie lower than the lower end of the rotor 20 lie below the liquid surface (i.e., the horizontal-condition liquid surface SL). In addition, two of the four lateral wall recessed portions 265 which lie on the upper side lie above the liquid surface. An interior of each of the two lateral wall recessed portions 265 which lie lower than the horizontal-condition liquid surface SL is filled with the oil O.

Referring to FIG. 5, when the vehicle 3 travels on an upward slope (or a downward slope), the drive apparatus 201 is inclined in a front-rear direction. At this time, as illustrated in FIG. 4, the liquid surface of the oil O gathered in the lower region of the housing portion 280 becomes the inclined-condition liquid surface IL, which is inclined with respect to the horizontal-condition liquid surface SL.

In the inclined condition, one of the four lateral wall recessed portions 265 lies below the liquid surface (i.e., the inclined-condition liquid surface IL), while the other three lateral wall recessed portions 265 lie above the liquid surface. If a shift occurs from a condition in which the vehicle 3 is horizontal (i.e., the horizontal condition) to a condition in which the vehicle 3 is inclined to a first side or a second side in the direction of travel (i.e., the inclined condition), the lateral wall recessed portion 265 moves upward in the vertical direction relative to the central axis J1. In addition, the liquid surface of the oil O accordingly moves lower than at least a portion of one of the lateral wall recessed portions 265. In addition, a portion of the oil O which has filled the interior of the lateral wall recessed portion 265 in the horizontal condition moves outside of the lateral wall recessed portion 265 as a result of the shift to the inclined condition. As a result, the height of the liquid surface of the oil O relative to the central axis J1 rises. That is, the liquid surface (i.e., the inclined-condition liquid surface IL) of the oil O in the inclined condition is closer to the central axis J1 than is the liquid surface (i.e., the horizontal-condition liquid surface SL) of the oil O in the horizontal condition.

The inclined-condition liquid surface IL lies higher than the lower end of the rotor 20. In the inclined condition, a portion of the rotor 20 soaks in the oil O gathered in the lower region of the housing portion 280. That is, in the inclined condition, the rotor 20 is in contact with the oil O. Thus, the rotor 20 can be cooled by the oil O. In addition, the oil O can be scraped up by the rotating rotor 20 to feed the oil 0 to a wide area over the stator 230, so that an increase in the efficiency in cooling the stator 230 can be achieved.

On the other hand, a reduction in the rotation efficiency of the rotor 20 is incurred as a result of a portion of the rotor 20 soaking in the oil O gathered in the lower region of the housing portion 280. However, when the vehicle 3 is climbing a hill, the rotation rate of the motor body 202 tends to be low, and therefore, the reduction in the rotation efficiency will be relatively slight. Meanwhile, when the vehicle 3 is descending a hill, the vehicle 3 is accelerated in the direction of travel due to its own weight, and it is therefore unlikely that the reduction in the rotation efficiency of the rotor 20 will be a problem.

According to the present modification, the inner circumferential surface 261r of the housing 206 includes a pair of lateral wall recessed portions 265 arranged to lie lower than the horizontal-condition liquid surface SL and arranged on the first side and the second side, respectively, of the central axis J1 in the direction of travel. One of the pair of lateral wall recessed portions 265 moves higher than the liquid surface of the oil O from below the liquid surface of the oil O as a result of a shift from the condition in which the vehicle 3 is horizontal to a condition in which the vehicle 3 is inclined to the first side in the direction of travel. Meanwhile, another one of the pair of lateral wall recessed portions 265 moves higher than the liquid surface of the oil O from below the liquid surface of the oil O as a result of a shift from the condition in which the vehicle 3 is horizontal to a condition in which the vehicle 3 is inclined to the second side in the direction of travel. That is, according to the present modification, whether the vehicle 3 is traveling on an upward slope or a downward slope, the inclination of the vehicle 3 causes the liquid surface of the oil O to approach the central axis J1 to bring the rotor 20 into contact with the oil O.

Referring to FIG. 5, the angle at which the vehicle 3 is inclined in the direction of travel with respect to a horizontal plane is defined as the inclination angle α. Referring to FIG. 4, the liquid surface (i.e., the inclined-condition liquid surface IL) when the vehicle 3 is inclined at the inclination angle α is inclined at the inclination angle α with respect to the horizontal-condition liquid surface SL. It is preferable that the oil O is arranged to make contact with the rotor 20 when the inclination angle α is 18° or more. This will make it possible to effectively cool the motor body 202 on a sharp upward slope or a sharp downward slope.

In the present modification, the pair of lateral wall recessed portions 265 which are arranged to lie lower than the horizontal-condition liquid surface SL are arranged to be symmetrical with respect to the reference line C1. Accordingly, the oil O will be in contact with the rotor 20 at the same inclination angle α whether the vehicle 3 is traveling upward or downward on a slope. However, one of the pair of lateral wall recessed portions 265 which lies on one side in the direction of travel may be arranged closer to the reference line C1 than is the other lateral wall recessed portion 265. In this case, the inclination angle α at which the oil O is in contact with the rotor will be different depending on whether the vehicle 3 is traveling upward or downward on a slope.

Similarly to the drive apparatus 1 according to the above-described embodiment, the drive apparatus 201 according to the present modification includes the pump portion 40 (see FIG. 1), which is arranged to be driven through the motor shaft 20a of the rotor 20. The pump portion 40 is arranged to lift the oil O gathered in the vertically lower region of the housing portion 280 to feed the oil O to the motor body 202 to cool the motor body 202.

The amount of the oil O which is fed by the pump portion 40 to the motor body 202 per unit time depends on the rotation rate of the rotor 20. Therefore, when the vehicle 3 is traveling on an upward slope, a sufficient amount of the oil O may not be fed from the pump portion 40 to the motor body 202 because of a low rotation rate of the rotor 20, although a high load is imposed on the motor body 202. According to the present modification, the rotor 20 and the stator 230 are efficiently cooled by the oil O gathered in the vertically lower region of the housing portion 280 when the vehicle 3 is traveling on an upward slope (or a downward slope). Thus, the motor body 202 can be sufficiently cooled even when the vehicle 3 is traveling on the upward slope (or the downward slope).

In addition, in the present modification, the pump portion 40 is a trochoid pump directly connected to the motor shaft 20a. The trochoid pump has a fixed discharge direction, and cannot be used with reverse rotation. Therefore, the pump portion 40 is able to feed the oil O to the motor body 202 when the rotor 20 is rotating in a forward direction, but does not feed the oil O to the motor body 202 when the rotor 20 is rotating in a reverse direction. According to the present modification, the motor body 202 can be efficiently cooled by the oil O being in contact with the rotor 20 when the vehicle 3 is traveling rearward on a hill.

Note that the drive apparatuses according to the above-described embodiments may be used for any desired purpose. Also note that features described above may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A drive apparatus to be mounted on a vehicle, the drive apparatus comprising:
a motor body including a rotor to rotate about a central axis extending in a horizontal direction perpendicular to a direction of travel of the vehicle, and a stator radially outside of the rotor;
a housing including a housing portion to house the motor body;
oil in a vertically lower region of the housing portion; and
a pump to move the oil from the vertically lower region of the housing portion to feed the oil to the motor body; wherein
a liquid surface of the oil in the vertically lower region of the housing portion approaches the central axis to bring the oil into contact with the rotor as a result of the vehicle being inclined forward or rearward in the direction of travel;
the housing portion includes an internal circumferential surface with multiple lateral recessed portions which are recessed in a radially outward direction;
when the vehicle is in a horizontal condition: two of the lateral recessed portions are below the liquid surface, all remaining ones of the lateral recessed portions other than the two of the lateral recessed portions are above the liquid surface, a lowermost portion of the rotor is above the liquid surface, and a lowermost portion of the stator is below the liquid surface; and
when the vehicle is in an inclined condition: one of the lateral recessed portions is below the liquid surface, all remaining ones of the lateral recessed portions other than the one of the lateral recessed portions are above the liquid surface, and the lowermost portion of the rotor is below the liquid surface.

2. The drive apparatus according to claim 1, wherein the inner circumferential surface of the housing surrounds the motor body on a radially outer side thereof and extends along the stator.

3. The drive apparatus according to claim 2, wherein the multiple lateral recessed portions include a pair of lateral wall recessed portions which are on a first side and a second side, respectively, of the central axis in the direction of travel.

4. The drive apparatus according to claim 2, wherein the inner circumferential surface of the housing is circular.

5. The drive apparatus according to claim 2, wherein an outer circumferential surface of the stator includes projecting portions projecting radially outward.

6. The drive apparatus according to claim 5, wherein the projecting portions are arranged at regular intervals in a circumferential direction about the central axis.

7. The drive apparatus according to claim 6, wherein the projecting portions are four in number.

8. The drive apparatus according to claim 1, wherein the oil contacts with the rotor when the vehicle is inclined at an angle of about 18° or more in the direction of travel.

9. The drive apparatus according to claim 1, wherein
the rotor includes a motor shaft; and
the pump is driven through the motor shaft of the rotor.

10. The drive apparatus according to claim 9, wherein the pump is a trochoid pump.

* * * * *